United States Patent [19]

Barrall

[11] E Patent Number: Re. 33,366

[45] Reissued Date of Patent: Oct. 2, 1990

[54] RIGID, WATER-RESISTANT PHOSPHATE CERAMIC MATERIALS AND PROCESS FOR PREPARING THEM

[75] Inventor: Jeffery L. Barrall, Lancaster, Pa.

[73] Assignee: Armstrong World Industries, Inc., Lancaster, Pa.

[21] Appl. No.: 253,819

[22] Filed: Oct. 6, 1988

Related U.S. Patent Documents

Reissue of:

[64] Patent No.: 4,375,516
Issued: Mar. 1, 1983
Appl. No.: 378,522
Filed: May 18, 1982

U.S. Applications:

[63] Continuation-in-part of Ser. No. 351,753, Mar. 2, 1982, abandoned, which is a continuation-in-part of Ser. No. 274,156, Jun. 16, 1981, abandoned.

[51] Int. Cl.[5] ..... C04B 21/00

[52] U.S. Cl. ..... 501/84; 501/85; 501/123; 501/111; 501/127; 501/153; 106/602

[58] Field of Search ..... 501/84, 85, 111, 123, 501/127, 153; 106/85, 86

[56] References Cited

U.S. PATENT DOCUMENTS

| | | | |
|---|---|---|---|
| 2,966,421 | 12/1960 | Zimmerman et al. | 501/86 |
| 2,992,930 | 7/1961 | Wheeler et al. | 501/84 |
| 3,148,996 | 9/1964 | Vukasovich et al. | 501/84 |
| 3,223,537 | 12/1965 | Wiegert et al. | 501/84 |
| 3,330,675 | 7/1967 | Magder | 501/84 |
| 4,207,113 | 6/1980 | Yoshino et al. | 501/84 |

*Primary Examiner*—William R. Dixon, Jr.
*Assistant Examiner*—Karl Group

[57] ABSTRACT

The present invention concerns rigid, water-resistant phosphate ceramic materials which may be prepared from components comprising metal oxide, calcium silicate, and phosphoric acid. By prereacting a portion of the metal oxide with the phosphoric acid and/or by adjusting the temperature of the acid solution when it is combined with the other ingredients, the character of the resulting product can be controlled to give foamed or unfoamed phosphate ceramic material.

80 Claims, No Drawings

RIGID, WATER-RESISTANT PHOSPHATE CERAMIC MATERIALS AND PROCESS FOR PREPARING THEM

Matter enclosed in heavy brackets [ ] appears in the original patent but forms no part of this reissue specification; matter printed in italics indicates the additions made by reissue.

This is a continuation-in-part of my copending application Ser. No. 351,753, filed Mar. 2, 1982, which is a continuation-in-part of my copending application Ser. No. 274,156 filed June 16, 1981, both now abandoned.

The present invention relates to rigid, water-resistant phosphate ceramic materials and more particularly to rigid, water-resistant phosphate ceramic materials which do not require subsequent thermal curing.

BACKGROUND OF THE INVENTION

Refractory metal phosphates have long been recognized as useful building and insulating materials. Compositions comprising phosphoric acid, a metal oxide, and metal silicates are known in the art; however, compositions comprising these constituents and having adequate strength are extremely difficult to prepare. For example, mixtures of aluminum oxide and 85% phosphoric acid are viscous and difficult to handle. If such mixtures are diluted with water, the ease of handling is greatly improved; nevertheless, when silicate, e.g. calcium silicate, is added and the resulting phosphate is thermally cured to drive off excess water, the refractory material obtained has relatively poor tensile strength. Alternatively, if all of the components are mixed together at once without using additional water, a rapid reaction ensues which cannot be handled under normal manufacturing circumstances.

THE PRIOR ART

Various phosphate compositions and processes for preparing them are found in the prior art. For example, U.S. Pat. No. 2,992,930, dated July 18, 1961 to William Wheeler et al. discloses compositions comprising powdered zirconium or aluminum oxides, calcium silicate for foam stabilization, phosphoric acid, a silica sol bonding agent and a blowing agent, the composition being prepared by blending the dry ingredients, adding the silica sol, stirring the mixture with phosphoric acid and allowing the resulting foam to become rigid. U.S. Pat. No. 3,148,996, dated Sept. 15, 1964 to Mark Vukasovich et al. discloses compositions which set into a rigid mass without heating and which may be rendered porous by incorporation of gas bubbles. These compositions consist of water, an acid phosphate consisting of phosphorus pentoxide and calcium, aluminum or zirconium oxides, and finely divided calcium silicate. They are formed by preparing a viscous solution of water, phosphorus pentoxide and an appropriate metal oxide, adding calcium silicate to the mixture and allowing it to partially harden. Foaming is then induced by adding an internal foaming agent or by mechanically introducing gas bubbles. U.S. Pat. No. 3,330,675, dated July 11, 1967 to Jules Magder discloses compositions comprising acidic aluminum phosphate, the carbonate, oxide, hydroxide or silicate of magnesium or zirconium, and organic or inorganic gas producing materials. Similarly, other patent references disclose related phosphate foams in which a powdered metal is incorporated into the acidic mixture, thereby inducing foaming through the release of hydrogen gas.

Although it is evident from these references that substantial effort has been extended to develop useful phosphate foams, many problems still exist. Most of the prior art foams have poor bond strength, thereby rendering them unusable as building materials. Some are moisture sensitive, many require heat curing to improve bond strength, and most contain other additives designed to circumvent weakness problems. In addition, most commercially manufactured foams contain blowing agents which can increase the cost of the product and sometimes contribute to bond weakness.

Accordingly, one object of the present invention is to provide strong, moisture-resistant phosphate ceramic materials which can be prepared without the use of external heat.

Yet another object of the present invention is to provide processes for the preparation of rigid phosphate foams without the use of added blowing agents.

Still another object of the present invention is to provide processes for the convenient and continuous production of phosphate foam whereby slumping of the foam is avoided.

These and other advantages of the present invention will become apparent from the description of the invention which follows.

SUMMARY OF THE INVENTION

The present invention concerns rigid, water-resistant phosphate ceramic materials which may be prepared from components comprising metal oxide, calcium silicate, and phosphoric acid. By prereacting a portion of the metal oxide with the phosphoric acid and/or by adjusting the temperature of the acid solution when it is combined with the other ingredients, the character of the resulting product can be controlled to give foamed or unfoamed phosphate ceramic material.

DETAILED DESCRIPTION OF PREFERRED EMBODIMENTS

In one embodiment, the process of the present invention comprises the steps of (1) selecting at least one metal oxide from the group consisting of $Al_2O_3$, MgO, CaO or ZnO or the hydrates thereof, said metal oxide comprising a total of from about 11 to about 65 parts by weight calculated on an anhydrous basis; (2) preparing a reaction solution comprising a portion of said metal oxide and from about 80 to about 190 parts by weight of a phosphoric acid solution comprising the equivalent of from about 35 to about 75% by weight of phosphorus based on the weight of the acid solution, the water pentoxide of hydration of said metal oxide being included when calculating the phosphorus pentoxide content; (3) preparing a mixture comprising the remainder of said metal oxide and about 100 parts by weight of calcium silicate. The temperature of said reaction solution is adjusted to a desired value and the mixture is proportionally intermixed with said reaction solution. The resulting intermixed material is placed in a desired configuration and the components thereof are allowed to interact. The amount of metal oxide used to prepare the reaction solution and the temperature of the reaction solution are selected so as to approximately predetermine the point in time at which said intermixed material becomes rigid relative to the point in time at which vaporization of the water occurs.

In a second embodiment the process of the present invention comprises the steps of (1) preparing a mixture comprising from about 11 to about 65 parts by weight calculated on an anhydrous basis of at least one metal oxide selected from the group consisting of $Al_2O_3$, MgO, CaO or ZnO or the hydrates thereof, and about 100 parts by weight of calcium silicate; and (2) preparing a reaction solution comprising from about 80 to about 190 parts by weight of a phosphoric acid solution comprising the equivalent of from about 35 to about 75% by weight of phosphorus pentoxide based on the weight of the acid solution, the water of hydration of said metal oxide being included when calculating the phosphorus pentoxide content. The temperature of the reaction solution is adjusted to a desired value and the solution is proportionally intermixed with said mixture. The resulting intermixed material is placed in a desired configuration and the components thereof are allowed to interact. The temperature of the reaction solution is selected so as to approximately predetermine the point in time at which said intermixed material becomes rigid relative to the point in time at which vaporization of the water occurs.

In a third embodiment the present invention comprises the steps of (1) selecting at least one metal oxide from the group consisting of $Al_2O_3$, MgO, CaO or ZnO or the hydrates thereof, said metal oxide comprising a total of from about 11 to about 65 parts by weight calculated on an anhydrous basis; (2) preparing a reaction solution comprising a portion of said metal oxide and from about 80 to about 190 parts by weight of a phosphoric acid solution comprising the equivalent of from about 35 to about 75% by weight of phosphorus pentoxide based on the weight of the acid solution, the water of hydration of said metal oxide being included when calculating the phosphorus pentoxide content; and (3) preparing a mixture comprising the remainder of said metal oxide and about 100 parts by weight of calcium silicate. The mixture is proportionally intermixed with said reaction solution and the resulting intermixed material is placed in a desired configuration where the components thereof are allowed to interact. The amount of metal oxide which is used to prepare the reaction solution is selected so as to approximately predetermine the point in time at which said intermixed material becomes rigid relative to the point in time at which vaporization of the water occurs.

In a fourth embodiment the present invention comprises a composition suitable to provide a rigid, water-resistant phosphate ceramic material, said composition comprising (1) from about 11 to about 65 parts by weight calculated on an anhydrous basis of at least one metal oxide selected from the group consisting of $Al_2O_3$, MgO, CaO or ZnO or the hydrates thereof; (2) from about 80 to about 190 parts by weight of a phosphoric acid solution comprising the equivalent of from about 35 to about 75% by weight of phosphorus pentoxide based on the weight of the acid solution, the water of hydration of said metal oxide being included when calculating the phosphorus pentoxide content; and (3) about 100 parts by weight of calcium silicate.

In a fifth embodiment the present invention comprises a rigid, water-resistant phosphate ceramic material obtained by reacting (1) from about 11 to about 65 parts by weight calculated on an anhydrous basis of at least one metal oxide selected from the group consisting of $Al_2O_3$, MgO, CaO or ZnO or the hydrates thereof; (2) from about 80 to about 190 parts by weight of a phosphoric acid solution comprising the equivalent of from about 35 to about 75% by weight of phosphorus pentoxide based on the weight of the acid solution, the water of hydration of said metal oxide being included when calculating the phosphorus pentoxide content; and (3) about 100 parts by weight of calcium silicate.

The components used to practice the present invention are all commercially available. Calcium silicate (100 parts by weight) is preferred in practicing the present invention although other silicates may also give satisfactory results. Calcium silicate occurs naturally and is referred to as wollastonite. Suitable foamed or unfoamed products can be obtained when this material is used in powdered form as described below. For making foams, the particle size will preferably be sufficiently small that most of the silicate passes through a 200-mesh Tyler Standard sieve.

A number of metal oxides such as aluminum oxide, magnesium oxide, calcium oxide and zinc oxide may be used to obtain satisfactory phosphate ceramic material. These oxides are used in powdered form, with finer particle-size oxides on the order of 325 mesh (Tyler Standard) of smaller giving generally superior results. Hydrated forms of the oxide may also be used and in many instances are preferred. In the event that a hydrate is used, the water of hydration must be taken into account so as not to provide excess water for the reaction. This may be conveniently done by including the water of hydration when calculating the phosphorus pentoxide content of the phosphoric acid solution.

From about 11 to about 65 parts by weight of metal oxide, calculated on an anhydrous basis, in relation to 100 parts of calcium silicate may be used to practice the present invention; however, from about 13–26 parts of metal oxide is preferred and from about 15–20 parts is especially preferred. The amount of oxide which is used will depend on whether it is in hydrated form and/or on its reactivity.

Anhydrous magnesium oxide reacts much more rapidly with phosphoric acid than does anhydrous aluminum oxide. For example, the former will react within minutes whereas the latter may required hours, depending on the temperature of the acid solution. If hydrated forms are used, however, the disparity in the reaction times is dramatically diminished. Hydrated magnesium oxide reacts more quickly than does anhydrous magnesium oxide, and it also reacts much more quickly than hydrated aluminum oxide. Nevertheless, hydrated aluminum oxide is substantially more reactive than anhydrous aluminum oxide for it reacts with the phosphoric acid solution within a matter of minutes, rather than hours. The implications of the reaction times will be set forth more fully below.

Suitable products can be obtained using any of the indicated oxides, alone or in combination, but anhydrous magnesium oxide (calcined) and hydrated aluminum oxide are particularly preferred to practice the present invention. Magnesium oxide tends to increase the strength and moisture resistance of the final product whereas aluminum oxide tends to provide superior setting characteristics.

Phosphoric acid is available in a variety of concentrations, 85% being the most common concentration for ortho-phosphoric acid. Other compositions, such as polyphosphoric acid, which will yield phosphoric acid upon dilution with water may also be satisfactory to practice the present invention, provided that the overall water content of the reaction system is not too high.

Too much water must be avoided because products will be obtained which, even though water resistant, will have poor strength. On the other hand, too little water is also detrimental, not only because intermixing of the materials is difficult to achieve, but because, in the case of foamed products, only high density foams are obtained.

As a general rule, the phosphoric acid will be suitable if it contains the equivalent of from about 35 to about 75% by weight of phosphorus pentoxide based on the weight of the acid solution. Preferably, the equivalent of phosphorus pentoxide will be about 40–70%, and more preferably about 45–65%. The remaining portion of the acid solution comprises water including, for purposes of calculation, any water of hydration from the metal oxide. From about 80 to about 190 parts by weight of the acid solution may be used in practicing this invention but preferably from about 90 to about 150 parts will be used, and more preferably from about 100 to about 130 parts of acid will be used.

Although the components used to practice the present invention have long been used in the art, the advantages to be derived when these components are combined as disclosed herein have never been recognized. It has been discovered that if the manner in which the ingredients are combined is controlled and excess water is avoided, a product will be obtained which requires no heat curing and is water resistant. While applicant is not bound by any theory as to the nature of the reactions involved in the present invention, two separate yet related phenomena are apparently occurring; namely, vaporization of the water and bonding of the materials. Heat generated by the reactants vaporizes the water present whereby the water vapor can act as a foaming agent. During approximately the same time span, bonding or setting occurs which results in the formation of a rigid ceramic-like material. These two phenomena will be referred to herein as "vaporization" or the "vaporization stage," and "setting" or the "setting stage," respectively.

To practice the present invention a reaction solution is preferably prepared by adding a desired portion of the metal oxide to the phosphoric acid solution. In addition, liquid additives such as surfactants may also be incorporated into the reaction solution. The remainder of the metal oxide and all of the calcium silicate are then combined and mixed with any solid additives, such as reinforcing fibers, thickeners, coloring matter and the like. The temperature of the reaction solution is preferably adjusted to a desired value and the solution is proportionally mixed with the remaining dry ingredients. The intermixed material is then placed in a desired configuration and the components of the system interact. The products which are obtained do not require heat curing and may be placed in boiling water without adverse effect. Nevertheless, they are not heat sensitive for samples have been heated to 1600° F. without significant loss of strength.

It has been discovered that the relative points in time at which vaporization and setting occur will dictate the nature of the product which is obtained. For example, if the vaporization stage is reached before the setting stage, the water vapor will cause the mixture to foam before the mass becomes rigid. Conversely, if setting occurs first, the material is unable to foam and the water vapor escapes through the interstitial spaces. The implications of the latter sequence of events will be set forth in more detail below, but in either case a product can be obtained which does not require heat curing, yet is resistant to water.

Two factors which contribute to the aforementioned events are the amount of metal oxide which is prereacted with the phosphoric acid and the temperature of the reaction solution at the time it is combined with the remaining dry ingredients. If only one of these factors is controlled, a ceramic-like material can still be produced. Nevertheless, it is preferable to control both parameters to facilitate handling and to obtain a superior product.

How these factors may be varied will be seen from the following. Generally speaking, if relatively less of the metal oxide is prereacted with the phosphoric acid relatively more foaming will occur during the subsequent mixing step before the mass of materials become rigid, provided that the temperature of the acid solution is not too low. Conversely, if relatively more of the metal oxide is prereacted with the phosphoric acid, less foaming will occur before the mass becomes rigid. If enough metal oxide is prereacted, essentially no foaming will occur. This result is apparently obtained because the preaddition of the metal oxide tends to lengthen the duration of the exothermic reaction or reactions which vaporize the water.

The temperature of the reaction solution during the subsequent mixing step can also significantly affect the resulting product. The higher the temperature of this solution, the more vigorous is the evolution of water vapor and the sooner water vaporization occurs when the reaction solution is mixed with the remaining dry ingredients. Thus, if the temperature is too high, the greater the likelihood of obtaining foams which contain voids or which foam rapidly and then slump. This effect may be mitigated somewhat, however, by including a surfactant in the reaction solution.

If the temperature is too low, the exothermic reaction may be suppressed so that no foaming will occur. Furthermore, too low a temperature may be detrimental because the material which is obtained might have relatively weak bonding strength. The optimum temperature of the reaction solution can vary depending on the reactants, but generally it has been found that a temperature range of about 35° to about 80° F. will give satisfactory results. When making foams, the preferred temperature range is about 38°–45° F., and most preferably 40° F., unless a foaming agent is added as hereinafter set forth.

In practice, other factors in addition to the amount of prereacted material and the temperature of the acid solution must be considered, many of which are dependent on the type of product to be produced. When making foams, the objective is to cause the foam to reach a desired height at about the time setting occurs. In essence, the water vaporization which causes the foaming should be timed so that it yields a uniform cell size in a product which is the right height and density after setting is complete. Cell size is affected by the rate at which the water vapor is given off and by the viscosity of the acid solution. The viscosity, in turn, depends on the type of oxide or oxides used, the particle size of the oxide, and the temperature of the acid solution.

Solutions having different viscosities are obtained when the various oxides are dissolved in phosphoric acid. For example, when increasing amounts of magnesium oxide are added to one aliquot of a standard strength (e.g. 85%) acid solution, viscosities are observed to vary from ca 50 cp to 1,000 cp at 72° F. However, when comparable molar amounts of aluminum oxide are added to a second aliquot of the same acid solution at 72° F., viscosities of from ca 50 cp to only 400 cp are observed. To make superior foams, it is preferred that the viscosity of the acid solution at the time of intermixing with the remaining ingredients not exceed about 400 cp. Thus, it will be seen that a second limitation to the use of magnesium oxide, aside from its tendency to vigorously cause foaming, is the viscosity of the reaction solution which results when it is used.

The higher the viscosity of the reaction solution the poorer the mixing of the ingredients and the poorer the foam quality of the product that is obtained. For that reason, it is often desirable to use more than one oxide. Thus, one oxide could be used to prepare the reaction solution and another could be combined with the calcium silicate. Alternatively, the oxide could be used as a mixture, both for forming the reaction solution and for mixing with the calcium silicate. A variety of possibilities exist; therefore, it is intended that all such possibilities be included within the scope of the present invention, and the present invention should not be limited to these two illustrations.

The density of the final product will depend to a great extent on the amount of metal oxide which is used to form the reaction solution; namely, the more of the metal oxide, the greater the density. As a general rule, in the absence of added foaming agents, if from about 0 to about 0.3 part of metal oxide for each one part of $P_2O_5$ in the acid solution is used to form the reaction solution, foams having densities of from about 40 down to about 15 pounds per cubic foot will be obtained. However, if more than about 0.3 part of metal oxide is used, a nonfoamed ceramic will be anticipated. Nevertheless, practical considerations, such as viscosity, affect the upper limit of prereacted material; thus, usually not more than 50% of the metal oxide can be conveniently prereacted.

Other considerations which affect the foams are particle size, surface properties and reinforcing materials. A small and uniform particle size is much preferred to practice the present invention because of the tendency of such material to promote fine cell structure. As previously noted, metal oxides which pass through a 325-mesh Tyler Standard sieve and calcium silicate which passes through a 200-mesh Tyler Standard sieve are preferred.

Cell size also depends on the surface properties of the material and it is often helpful to include one or more surfactants to promote cell stability. Virtually any surfactant which is not affected by the phosphoric acid may be used. One surfactant which has been found particularly satisfactory is [dimethylccoamine] *dimethylcocoamine* oxide which is sold by Armak under the name Aramox DMC. Care must be taken in handling this material, however, because it is a skin and eye irritant.

Because foams are of a porous nature, they tend to have lower tensile strength than unfoamed materials. Accordingly, it is often advisable to add fibrous reinforcing material to strengthen the foam. Polyester, glass, polypropylene and nylon, among others, have been used with success, although the conditions under which the final product will be used may influence the selection of fiber. For example, for a high temperature application, glass fibers would be much more stable than would organic fibers. Generally, fiber lengths of from ⅛" to 1" will be suitable, with approximately ½" fibers being especially suitable.

When preparing unfoamed phosphate ceramics, factors such as particle size, viscosity, temperature and surface properties become much less important because cell structure is not a concern. Accordingly, coarser particle-size materials and a higher viscosity of the reaction solution may be permissible, subject only to constraints imposed by the handleability of the reactants. A much higher temperature for the reaction solution may also be used because the unfoamed material will not slump. Furthermore, no surfactant will be required because there is no cell stability problem.

Aside from these considerations, the objective in preparing an unfoamed ceramic is comparable to that of preparing a foamed material, the major difference being that, with unfoamed materials, it is necessary to postpone the vaporization stage until the mass has become rigid, thus preventing expansion of the phosphate material. This is conveniently accomplished by prereacting a greater amount of the metal oxide. However, care must be taken to ensure that the water can escape from the unfoamed material. If the internal pressure of the structure becomes too great due to water pressure, the rigid ceramic can be cracked. For this reason, when preparing unformed phosphate ceramics, it is often desirable to include porous fillers which provide passageways through which the water vapor can escape. Examples of fillers which are satisfactory are vermiculite and perlite.

Surprisingly, I have also discovered that satisfactory foamed products may be produced by combining the techniques of the present invention with foaming agents taught by the prior art. The prior art contains references to the use of carbon dioxide or carbon dioxide-producing materials and hydrogen or hydrogen-producing materials, as well as other organic or inorganic gas-producing materials, during the production of phosphate products. Such agents may also be used to advantage in producing the rigid, water-resistant phosphate ceramics of the present invention.

Although virtually any prior art foaming agent may be employed, the results that may be obtained are exemplified by the use of various carbonates. Carbonates such as $MgCO_3$, $CaCO_3$, $ZnCO_3$, $Li_2CO_3$ and the like, or mixtures thereof, which produce relatively insoluble phosphates are preferred; however, $MgCO_3$ is especially preferred because it typically produces a foam having a relatively uniform cell size and a generally suitable density. Other carbonates such as $Na_2CO_3$ and $K_2CO_3$ will produce relatively soluble phosphate salts may also be employed where leaching of the phosphate from the resulting phosphate ceramic when it is exposed to water will not be detrimental.

When using dry foaming agents, it is usually desirable to mix them with the other dry ingredients comprising the calcium silicate and a portion of the metal oxide; however, these foaming agents may also be added separately. Because the foaming obtained in the presence of such agents is not provided by water vaporization, it is undesirable to have the exotherm occur prior to setting. For that reason, it is usually necessary to prereact a greater portion of the metal oxide with the phosphoric acid solution. Often this will cause an undesirable increase in the viscosity of the acid solution. Accordingly, when using an added foaming agent, it may be necessary to dilute the acid solution somewhat in order to control the viscosity. However, care must be taken to avoid using excess water because the combination of using additional water and prereacting more of the metal oxide tends to lower the temperature of the exotherm, thereby increasing the possibility of producing a phosphate ceramic with unsatisfactory performance characteristics.

As an additional consideration, the temperature of the reaction solution at the time of intermixing with the dry components can often be higher when foaming is achieved using dry foaming agents rather than using water vaporization because setting must occur prior to the occurrence of the exothermic reaction. Thus, when using dry foaming agents, it is often desirable for the reaction solution to be within a preferred temperature range of about 50° to 60° F. rather than the preferred range of about 38° to 45° F. referred to earlier in connection with the water vaporization foaming process.

Of course, it is also possible to use a liquid foaming agent such as a fluorinated hydrocarbon having a boiling point lower than the temperature at which setting of the foam occurs. Examples of such hydrocarbons are Freon-11 or Freon-113 sold by duPont. Hydrocarbons of this type may be added to and mixed with the acid solution, or they may be added separately at the time of intermixing with the solid ingredients. Non-fluorinated hydrocarbons having an appropriate boiling point may also be used, but they are much less desirable because of the inherent risk of fire associated with their use.

The manner of adding these foaming agents, whether wet or dry, may be a matter of choice to the artisan or it may depend on various factors such as the type of product desired and/or the type of equipment utilized. In certain circumstances, the method of use may be controlled by the nature of the foaming agent. For example, the carbonates react chemically with the acid solution; thus, they cannot be added to the acid solution at a point too early in the reaction sequence. Conversely, fluorinated hydrocarbons produce foaming by passing from a liquid to a gaseous state; thus, they may be maintained in contact with the acid solution if the temperature of the mixture remains sufficiently low. In the latter case, however, it must be recognized that fluorinated hydrocarbons form a two-phase system with the acid solution. Therefore, care should be taken to ensure that the two-phase system is uniformly mixed prior to intermixing with the solid ingredients.

Because the art discloses a wide variety of materials which may be employed in various ways to produce the phosphate ceramics of the present invention, the term "foaming agents," as used herein, is intended to encompass all such materials, provided that they produce phosphate ceramics having the characteristics previously set forth.

The following examples, in which all parts are expressed by weight, will be illustrative to demonstrate the advantages of the present invention.

EXAMPLES

Example 1

A phosphate foam was prepared from the following components:

| Component | Weight (g) | Parts per 100 parts $CaSiO_3$ |
|---|---|---|
| $Al_2O_3.3H_2O$ | 14.42 | 36.04 |
| 85% $H_3PO_4$ (61.6% $P_2O_5$) | 41.58 | 104.0 |
| $CaSiO_3$ | 40.0 | 100 |

-continued

| Component | Weight (g) | Parts per 100 parts $CaSiO_3$ |
|---|---|---|
| Surfactant | 0.04 | 0.1 |

If these relationships are calculated by placing the metal oxide on an anhydrous basis and including the water of hydration as part of the acid solution, the following is obtained:

| Component | Parts per 100 Parts $CaSiO_3$ |
|---|---|
| $Al_2O_3$ | 23.56 |
| 75.9% $H_3PO_4$ (55% $P_2O_5$) | 116.5 |
| $CaSiO_3$ | 100 |
| Surfactant | 0.1 |

The reaction solution was prepared by adding 1.04 parts of $Al_2O_3.3H_2O$ to 104 parts of phosphoric acid and stirring the mixture with moderate agitation for approximately 15 minutes until a clear solution was obtained. The surfactant (0.1 part) was added to the reaction solution, which was then cooled to 40° F. The remaining dry ingredients (100 parts of calcium silicate and 35 parts of aluminum oxide trihydrate) were mixed together and fed into a Readco continuous processor. The reaction solution was also fed into the Readco mixer through a different addition port. The ingredients were proportionally mixed therein, discharged onto a moving belt covered with a scrim material and leveled. Foaming began in approximately 1.5 minutes and the mass of material became rigid in approximately 2 minutes. A continuous block of foamed material 1" thick and 5" wide was obtained in this manner. The foamed material had a fine cell structure and a density of 18 pounds per cubic foot. The compressive strength of this material according to ASTM D1621 was 60 psi. The modulus of rupture according to ASTM C209 was 70 psi. No evidence of cracking was detected when 20-g cubes of the product were either placed in boiling water for ½ hours and allowed to dry, or wetted with 50 g of water at room temperature and allowed to dry.

Example 2

A phosphate foam was prepared from the same components used in Example 1. The reaction solution was prepared by adding 1.04 parts of $Al_2O_3.3H_2O$ to 104 parts of phosphoric acid and stirring the mixture with moderate agitation for approximately 15 minutes until a clear solution was obtained. The surfactant (0.1 part) was then added to the reaction solution. The remaining dry ingredients (100 parts of calcium silicate and 35 parts of aluminum oxide trihydrate) were mixed together and fed into a Readco continuous processor. The reaction solution at room temperature, 72° F., was also fed into the Readco mixer through a different addition port. The ingredients were proportionally mixed therein, discharged onto a moving belt covered with a scrim material and leveled. Foaming began in approximately 42 seconds and the mass of material became rigid in approximately 50 seconds. A continuous block of foamed material 1" thick and 5" wide was obtained in this manner. The foamed material had a coarse, irregular cell structure and a density of 17 pounds per cubic foot. The compressive strength of this material according to ASTM D1621 was 50 psi. The modulus of rupture according to ASTM C209 was 50 psi. No evidence of cracking was detected when 20-g cubes of the product were either placed in boiling water for ½ hour and allowed to dry, or wetted with 50 g of water at room temperature and allowed to dry.

EXAMPLE 3

A phosphate foam was prepared from the following components:

| Component | Weight (g) | Parts per 100 parts $CaSiO_3$ |
|---|---|---|
| $Al_2O_3.3H_2O$ | 11.44 | 30.1 |
| MgO (calcined) | 3.0 | 7.9 |
| 80% $H_3PO_4$ (58.0% $P_2O_5$) | 43.56 | 114.63 |
| $CaSiO_3$ | 38 | 100 |
| Surfactant | 0.3 | 0.79 |
| ¼" Polyester Fiber | 0.2 | 0.53 |

If these relationships are calculated by placing the metal oxide on an anhydrous basis and including the water of hydration as part of the acid solution, the following is obtained:

| Component | Parts per 100 Parts $CaSiO_3$ |
|---|---|
| $Al_2O_3$ | 19.7 |
| MgO (calcined) | 7.9 |
| 73.3% $H_3PO_4$ (53.2% $P_2O_5$) | 125.05 |
| $CaSiO_3$ | 100 |
| Surfactant | 0.79 |
| ¼" Polyester Fiber | 0.53 |

The reaction solution was preapred by adding 1.15 parts of $Al_2O_3.3H_2O$ to 114.63 parts of phosphoric acid and stirring the mixture with moderate agitation for approximately 15 minutes until a clear solution was obtained. The surfactant (0.79 part) was added to the reaction solution, which was then cooled to 40° F. The remaining dry ingredients (100 parts of calcium silicate, 28.95 parts of aluminum oxide trihydrate, 7.9 parts of magnesium oxide and 0.53 parts polyester fiber) were mixed together and fed into a Readco continuous processor. The reaction solution was also fed into the Readco mixer through a differnt addition port. The ingredients were proportionally mixed therein, discharged onto a moving belt covered with a scrim material and leveled. Foaming began in approximately 57 seconds and the mass of material became rigid in approximately 1 minute 51 seconds. A continuous block of foamed material 1" thick and 5" wide was obtained in this manner. The foamed material had a fine cell structure and a density of 19 pounds per cubic foot. The compressive strength of this material according to ASTM D1621 was 100 psi. The modulus of rupture according to ASTM C209 was 80 psi. No evidence of cracking was detected when 20-g cubes of the product were either placed in boiling water for ½ hour and allowed to dry, or wetted with 50 g of water at room temperature and allowed to dry.

Example 4

A phosphate foam was prepared from the following components:

| Component | Weight (g) | Parts per 100 parts $CaSiO_3$ |
|---|---|---|
| $Al_2O_3.3H_2O$ | 16.0 | 40.0 |
| 85% $H_3PO_4$ (61.1% $P_2O_5$) | 40.0 | 100.0 |
| $CaSiO_3$ | 40.0 | 100.0 |
| Surfactant | 0.04 | 0.1 |

If these relationships are calculated by placing the metal oxide on an anhydrous basis and including the water of hydration as part of the acid solution, the following is obtained:

| Component | Parts per 100 Parts $CaSiO_3$ |
|---|---|
| $Al_2O_3$ | 26.15 |
| 74.7% $H_3PO_4$ (54.1% $P_2O_5$) | 113.85 |
| $CaSiO_3$ | 100 |
| Surfactant | 0.1 |

The reaction solution was prepared by adding 5 parts of $Al_2O_3.3H_2O$ to 100 parts of phosphoric acid and stirring the mixture with moderate agitation for approximately 15 minutes until a clear solution was obtained. The surfactant (0.1 part) was added to the reaction solution, which was then cooled to 40° F. The remaiing dry ingredients (100 parts of calcium silicate and 35 parts of aluminum oxide trihydrate) were mixed together and fed into a Readco continuous processor. The reaction solution was also fed into the Readco mixer through a different addition port. The ingredients were proportionally mixed therein, discharged onto a moving belt covered with a scrim material and leveled. Foaming began in approximately 1 minute 45 seconds and the mass of material became rigid in approximately 2 minutes 5 seconds. A continuous block of foamed material 1" thick and 5" wide was obtained in this manner. The foamed material had a fine cell structure and a density of 29 pounds per cubic foot. The compressive strength of this material according to ASTM D1621 was 120 psi. The modulus of rupture according to ASTM C209 was 120 psi. No evidence of cracking was detected when 20-g cubes of the product were either placed in boiling water for ½ hour and allowed to dry, or wetted with 50 g of water at room temperature and allowed to dry.

Example 5

A non-foamed phosphate ceramic was prepared from the following components:

| Component | Weight (g) | Parts per 100 parts $CaSiO_3$ |
|---|---|---|
| $Al_2O_3.3H_2O$ | 18.4 | 40.89 |
| 85% $H_3PO_4$ (61.6% $P_2O_5$) | 39.6 | 88.0 |
| $CaSiO_3$ | 45.0 | 100 |

If these relationships are calculated by placing the metal oxide on an anhydrous basis and including the water of hydration as part of the acid solution, the following is obtained:

| Component | Parts per 100 Parts $CaSiO_3$ |
|---|---|
| $Al_2O_3$ | 26.73 |
| 73.2% $H_3PO_4$ (53.1% $P_2O_5$) | 102.16 |
| $CaSiO_3$ | 100 |

The reaction solution was prepared by adding 9.78 parts of $Al_2O_3.3H_2O$ to 88 parts of phosphoric acid and stirring the mixture with moderate agitation for approximately 15 minutes until a clear solution was obtained. The remaining dry ingredients (100 parts of calcium silicate and 31.1 parts of aluminum oxide trihydrate) were mixed together and fed into a Readco continuous processor. The reaction solution at room temperature was also fed into the Readco mixer through a different addition port. The ingredients were proportionally mixed therein, discharged onto a moving belt covered with a scrim material and leveled. No foaming occurred and the mixture set into a solid mass in 2 minutes 10 seconds. The hard ceramic-like material had a density of 60 pounds per cubic foot.

Example 6

A phosphate ceramic was prepared from the following components:

| Component | Weight (g) | Parts per 100 parts $CaSiO_3$ |
|---|---|---|
| $Al_2O_3.3H_2O$ | 17.44 | 38.76 |
| 72% $H_3PO_4$ (52.18% $P_2O_5$) | 40.56 | 90.13 |
| $CaSiO_3$ | 45 | 100 |
| Vermiculite (6#/ft$^3$) | 4 | 8.89 |

If these relationships are calculated by placing the metal oxide on an anhydrous basis and including the water of hydration as part of the acid solution, the following is obtained:

| Component | Parts per 100 Parts $CaSiO_3$ |
|---|---|
| $Al_2O_3$ | 25.34 |
| 63% $H_3PO_4$ (45.4% $P_2O_5$) | 103.55 |
| $CaSiO_3$ | 100 |
| Vermiculite | 8.89 |

The reaction solution was prepared by adding 7.65 parts of $Al_2O_3.3H_2O$ to 90.13 parts of phosphoric acid and stirring the mixture with moderate agitation for approximately 15 minutes until a clear solution was obtained. The remaining dry ingredients (100 parts of calcium silicate, 31.11 parts of aluminum oxide trihydrate and 8.89 parts of vermiculite) were mixed together and fed into a Readco continuous processor. The reaction solution at room temperature (72° F.) was also fed into the Readco mixer through a different addition port. The ingredients were proportionally mixed therein, discharged onto a moving belt covered with a scrim material and leveled. No foaming occurred and the mixture set into a solid mass in 2 minutes 30 seconds. The hard ceramic-like material had a density of 59 pounds per cubic foot.

Example 7

This example illustrates the use of a prior art dry foaming agent in combination with the present invention to produce a phosphate ceramic material. A phosphate foam was prepared from the following components:

| Component | Weight (g) | Parts per 100 parts $CaSiO_3$ |
|---|---|---|
| $Al_2O_3.3H_2O$ | 8.97 | 17.94 |
| 68% $H_3PO_4$ (49.3% $P_2O_5$) | 56.03 | 112.06 |
| $CaSiO_3$ | 50.00 | 100.0 |
| $MgCO_3$ | 2.0 | 4.0 |
| MgO (calcined) | 7.0 | 14.0 |
| Talc Filler | 10.0 | 20.0 |

If these relationships are calculated by placing the metal oxide on an anhydrous basis and including the water of hydration as part of the acid solution, the following is obtained:

| Component | Parts per 100 parts $CaSiO_3$ |
|---|---|
| $Al_2O_3$ | 11.72 |
| 64.4% $H_3PO_4$ (46.7% $P_2O_5$) | 118.27 |
| $CaSiO_3$ | 100.0 |
| $MgCO_3$ | 4.0 |
| MgO (calcined) | 14.0 |
| Talc Filler | 20.0 |

The reaction solution was prepared at room temperature by adding 17.94 parts of $Al_2O_3.3H_2O$ with stirring to 112.06 parts of phosphoric acid solution. The resulting clear solution was cooled to 55° F. The remaining dry ingredients (100 parts of calcium silicate, 4.0 parts of magnesium carbonate, 14.0 parts of magnesium oxide and 20.0 parts of filler) were mixed together and fed into a Readco continuous processor. The reaction solution at 55° F. was also fed into the Readco mixer through a different addition port. The ingredients were proportionally mixed therein, and discharged onto a moving belt covered with a scrim material. Due to the presence of the acid in the mixture, foaming was occurring as the material exited the mixer. The foaming material was leveled and it solidified in approximately 1 minute 30 seconds, with an exothermic reaction occurring approximately 30 seconds thereafter as indicated by the evolution of steam. The rigid foamed material had a fine cell structure and a density of 12 pounds per cubic foot. The compressive strength of this material according to ASTM D1621 was 90 pounds per square inch and the modulus of rupture according to ASTM C209 was 40 pounds per square inch. This material floated when placed in water, indicating that the water could not readily penetrate the foam matrix.

Example 8

This example illustrates the use of a liquid prior art foaming agent to produce the phosphate ceramic of the present invention. A phosphate ceramic was prepared from the following components:

| Component | Weight (g) | Parts per 100 parts per $CaSiO_3$ |
|---|---|---|
| $Al_2O_3.3H_2O$ | 9.0 | 18.0 |
| 80.2% $H_3PO_4$ (58.2% $P_2O_5$) | 53.0 | 106.0 |
| $CaSiO_3$ | 50.0 | 100.0 |
| Freon-11 | 4.0 | 8.0 |
| MgO (calcined) | 5.0 | 10.0 |
| Talc Filler | 10.0 | 20.0 |

If these relationships are calculated by placing the metal oxide on an anhydrous basis and including the water of hydration as part of the acid solution, the following is obtained:

| Component | Parts per 100 parts $CaSiO_3$ |
|---|---|
| $Al_2O_3$ | 11.8 |
| 75.8% $H_3PO_4$ (55% $P_2O_5$) | 112.2 |
| $CaSiO_3$ | 100.0 |
| Freon-11 | 8.0 |
| MgO (calcined) | 10.0 |
| Talc Filler | 20.0 |

The reaction solution was prepared at room temperature by mixing 10 parts of $Al_2O_3.3H_2O$ with stirring to 106.0 parts of phosphoric acid solution, after which the reaction solution was cooled to 55° F. The remaining dry ingredients (100 parts of calcium silicate, 8.0 parts of aluminum oxide trihydrate, 10.0 parts of magnesium oxide and 20.0 parts of filler) were mixed together and fed into a Readco continuous processor. The ingredients were proportionally mixed therein, the Freon-11 being added through a separate in-line mixer in order to obtain good dispersion. The intermixed material exited from the mixer and foaming occurred slowly over a 3-minute period. Solidifaction occurred in 4 minutes, and the exothermic reaction occurred in 4.5 minutes. The resulting coarse-celled foam had a density of 19 pounds per cubic foot.

My invention is not restricted solely to the descriptions and illustrations provided above, but encompasses all modifications envisaged by the following claims.

I claim:

1. A process for manufacturing rigid, water resistant phosphate ceramic material, said process comprising the steps of:

preparing a metal oxide comprising from about 11 to about 65 parts by weight calculated on an anhydrous basis of at least one metal oxide selected from the group consisting of $Al_2O_3$, MgO, CaO or ZnO or the hydrates thereof, preparing a reaction solution comprising a portion of said metal oxide and from about 80 to about 190 parts by weight of a phosphoric acid solution comprising the equivalent of from about 35 to about 75% by weight of phosphorus pentoxide based on the weight of the acid solution, the water of hydration of said metal oxide being included when calculating the phosphorus pentoxide content, preparing a mixture comprising the remainder of said metal oxide and about 100 parts by weight of calcium silicate, adjusting the temperature of said reaction solution to a desired value, proportionally intermixing said mixture with said reaction solution, and placing the resulting intermixed material in a desired configuration and allowing the components thereof to interact, the amount of metal oxide used to prepare the reaction solution and the temperature of the reaction solution being selected so as to approximately predetermine the point in time at which said intermixed material becomes rigid relative to the point in time at which vaporization of the water occurs.

2. The process according to claim 1 hereof comprising from about 13 to about 26 parts of metal oxide, about 100 parts of calcium silicate, and from about 90 to about 150 parts of phosphoric acid solution comprising the equivalent of from about 40 to about 70% phosphorus pentoxide.

3. The process according to claim 1 hereof comprising from about 15 to about 22 parts of metal oxide, about 100 parts of calcium silicate, and from about 100 to about 130 parts of phosphoric acid solution comprising the equivalent of from about 45 to about 65% phosphorus pentoxide.

4. The process according to claims 1, 2, or 3 hereof wherein the temperature of the reaction solution is from about 35° to 80° F.

5. The process according to claims 1, 2, or 3 hereof wherein the temperature of said reaction solution is from about 38° to 45° F.

6. The process according to claims 1, 2 or 3 hereof wherein the temperature of said reaction solution is about 40° F.

7. The process according to claims 1, 2, or 3 hereof wherein the particle size of said metal oxide is not larger than 325 mesh (Tyler Standard) and the particle size of said calcium silicate is not larger than 200 mesh (Tyler Standard).

8. The process according to claims 1, 2, or 3 hereof wherein said metal oxide is aluminum oxide trihydrate.

9. The process according to claims 1, 2, or 3 hereof wherein said metal oxide is magnesium oxide.

10. The process according to claims 1, 2, or 3 hereof wherein said metal oxide comprises a mixture of aluminum oxide trihydrate and magnesium oxide.

11. The water resistant phosphate ceramic product of the process set forth in claims 1, 2, or 3 hereof.

12. The products according to claim 11 hereof wherein said products have a foamed structure.

13. The products according to claim 11 hereof wherein said products have an unfoamed structure.

14. The products according to claim 13 hereof wherein said products comprise a filler.

15. The process according to claims 1, 2, or 3 hereof wherein said reaction solution comprises a surfactant.

16. The process according to claims 1, 2, or 3 hereof wherein said mixture comprises fibrous reinforcing material.

17. The process according to claims 1, 2, or 3 hereof wherein said intermixed material comprises a foaming agent.

18. The process according to claim 17 hereof wherein said foaming agent is a carbonate selected from the group consisting of $MgCO_3$, $CaCO_3$, $ZnCO_3$ or $Li_2CO_3$.

19. The process according to claim 17 hereof wherein said foaming agent is a fluorinated hydrocarbon having a boiling point lower than the temperature at which said intermixed material becomes rigid.

20. A process for manufacturing rigid, water resistant phosphate ceramic material, said process comprising the steps of:

preparing a mixture comprising [from about 11 to about 65 parts by weight calculated on an anhydrous basis of] at least one metal oxide selected from the group consisting of $Al_2O_3$, MgO, CaO, or ZnO or the hydrates thereof and about 100 parts by weight of calcium silicate, preparing a reaction solution comprising *at least one metal oxide from the group consisting of $Al_2O_3$, MgO, CaO, or ZnO or the hydrates thereof and* from about 80 to about 190 parts by weight of a phosphoric acid solution comprising the equivalent of from about 35 to about 75% by weight of phosphorus pentoxide based on the weight of the acid solution, the water of hydration of said metal oxide being included when calculating the phosphorus pentoxide content, *the total of metal oxide in said mixture and in said reaction solution being from about 11 to about 65 parts by weight calculated on an anhydrous basis,* adjusting the temperature of said reaction solution to a desired value, proportionally intermixing said mixture with said reaction solution, and placing the resulting intermixed material in a desired configuration and allowing the compounds thereof to interact, the temperature of the reaction solution being selected so as to approximately predetermine the point in time at which said intermixed material becomes rigid relative to the point in time at which vaporization of the water occurs.

21. The process according to claim 20 hereof comprising from about 13 to about 26 parts of metal oxide, about 100 parts of calcium silicate, and from about 90 to about 150 parts of phosphoric acid solution comprising the equivalent of from about 40 to about 70% phosphorus pentoxide.

22. The process according to claim 20 hereof comprising from about 15 to about 22 parts of metal oxide, about 100 parts of calcium silicate, and from about 100 to about 130 parts of phosphoric acid solution comprising the equivalent of from about 45 to about 65% phosphorus pentoxide.

23. The process according to claims 20, 21, or 22 hereof wherein the temperature of the reaction solution is from about 35° to 80° F.

24. The process according to claims 20, 21, or 22 hereof wherein the temperature of said reaction solution is from about 38° to 45° F.

25. The process according to claims 20, 21, or 22 hereof wherein the temperature of said reaction solution is about 40° F.

26. The process according to claims 20, 21, or 22 hereof wherein the particle size of said metal oxide is not larger than 325 mesh (Tyler Standard) and the particle size of said calcium silicate is not larger than 200 mesh (Tyler Standard).

27. The process according to [claims] *claim* 20, [21, or 22] hereof wherein said metal oxide *in the reaction solution* is aluminum oxide trihydrate.

28. The process according to [claims] *claim* 20, [21, or 22] hereof wherein said metal oxide *in the mixture* is magnesium oxide.

29. The process according to claims 20, 21, or 22 hereof wherein said metal oxide comprises a mixture of aluminum oxide trihydrate and magnesium oxide.

30. The water resistant phosphate ceramic product of the process set forth in claims 20, 21, or 22 hereof.

31. The products according to claim 30 hereof wherein said products have a foamed structure.

32. The products according to claim 30 hereof wherein said products have an unfoamed structure.

33. The products according to claim 32 hereof wherein said products comprise a filler.

34. The process according to claims 20, 21, or 22 hereof wherein said reaction solution comprises a surfactant.

35. The process according to claims 20, 21, or 22 hereof wherein said mixture comprises fibrous reinforcing material.

36. The process according to claims 20, 21, or 22 hereof wherein said intermixed material comprises a foaming agent.

37. The process according to claim 36 hereof wherein said foaming agent is a carbonate selected from the group consisting of $MgCO_3$, $CaCO_3$, $ZnCO_3$ or $Li_2CO_3$.

38. The process according to claim 36 hereof wherein said foaming agent is a fluorinated hydrocarbon having a boiling point lower than the temperature at which said intermixed material becomes rigid.

39. A process for manufacturing rigid, water resistant phosphate ceramic material, said process comprising the steps of:

preparing a metal oxide comprising from about 11 to about 65 parts by weight calculated on an anhydrous basis of at least one metal oxide selected from the group consisting of $Al_2O_3$, MgO, CaO or ZnO or the hydrates thereof, preparing a reaction solution comprising a portion of said metal oxide and from about 80 to about 190 parts by weight of a phosphoric acid solution comprising the equivalent of from about 35 to about 75% by weight of phosphorus pentoxide based on the weight of the acid solution, the water of hydration of said metal oxide being included when calculating the phosphorus pentoxide content, preparing a mixture comprising the remainder of said metal oxide and about 100 parts by weight of calcium silicate, proportionally intermixing said mixture with said reaction solution, and placing the resulting intermixed material in a desired configuration and allowing the components thereof to interact, the amount of metal oxide used to prepare the reaction solution being selected so as to approximately predetermine the point in time at which said intermixed material becomes rigid relative to the point in time at which vaporization of the water occurs.

40. A process according to claim 39 hereof comprising from about 13 to about 26 parts of metal oxide, about 100 parts of calcium silicate, and from about 90 to about 150 parts of phosphoric acid solution comprising the equivalent of from about 40 to about 70% phosphorus pentoxide.

41. A process according to claim 39 hereof comprising from about 15 to about 22 parts of metal oxide, about 100 parts of calcium silicate, and from about 100 to about 130 parts of phosphoric acid solution comprising the equivalent of from about 45 to about 65% phosphorus pentoxide.

42. The process according to claims 39, 40, or 41 hereof wherein the particle size of said metal oxide is not larger than 325 mesh (Tyler Standard) and the particle size of said calcium silicate is not larger than 200 mesh (Tyler Standard).

43. The process according to claims 39, 40, or 41 hereof wherein said metal oxide is aluminum oxide trihydrate.

44. The process according to claims 39, 40, or 41 hereof wherein said metal oxide is magnesium oxide.

45. The process according to claims 39, 40, or 41 hereof wherein said metal oxide comprises a mixture of aluminum oxide trihydrate and magnesium oxide.

46. The water resistant phosphate ceramic product of the process set forth in claims 39, 40, or 41 hereof.

47. The products according to claim 46 hereof wherein said products have a foamed structure.

48. The products according to claim 46 hereof wherein said products have an unfoamed structure.

49. The products according to claim 48 hereof wherein said products comprise a filler.

50. The process according to claims 39, 40, or 41 hereof wherein said reaction solution comprises a surfactant.

51. The process according to claims 39, 40, or 41 hereof wherein said mixture comprises fibrous reinforcing material.

52. The process according to claim 39, 40 or 41 hereof wherein said intermixed material comprises a foaming agent.

53. The process according to claim 52 hereof wherein said foaming agent is a carbonate selected from the group consisting of $MgCO_3$, $CaCO_3$, $ZnCO_3$ or $Li_2CO_3$.

54. The process according to claim 52 hereof wherein said foaming agent is a fluorinated hydrocarbon having a boiling point lower than the temperature at which said intermixed material becomes rigid.

55. A composition suitable to provide a rigid, water-resistant phosphate ceramic material, said composition comprising:

from about 11 to about 65 parts by weight calculated on an anhydrous basis of at least one metal oxide selected from the group consisting of $Al_2O_3$, MgO, CaO or ZnO or the hydrates [8] thereof *divided between two sets of components*;

*the first set of components being said oxide and* from about 80 to about 190 parts by weight of phosphoric acid solution comprising the equivalent of from about 35 to about 75% by weight of phosphorus pentoxide based on the weight of the acid solution, the water of hydration of said metal oxide being included when calculating the phosphorus pentoxide content; and

*the second set of components being said oxide and* about 100 parts by weight of calcium silicate.

56. The invention according to claim 55 hereof wherein said composition comprises from about 13 to about 26 parts of metal oxide, about 100 parts of calcium silicate, and from about 90 to about 150 parts of phosphoric acid solution comprising the equivalent of from about 40 to about 70% phosphorus pentoxide.

57. The invention according to claim 55 hereof wherein said composition comprises about 15 to about 22 parts of metal oxide, about 100 parts of calcium silicate, and from about 100 to about 130 parts of phosphoric acid solution comprising the equivalent of from about 45 to about 65% phosphorus pentoxide.

58. The invention according to claims 55, 56 or 57 hereof wherein the particle size of said metal oxide is not larger than 325 mesh (Tyler Standard) and the particle size of said calcium silicate is not larger than 200 mesh (Tyler Standard).

59. The composition according to claims 55, 56 or 57 hereof wherein said metal oxide *in the first set of components* is aluminum oxide trihydrate.

60. The invention according to claims 55, 56 or 57 hereof wherein said metal oxide *in the second set of components* is magnesium oxide.

61. The invention according to claims 55, 56 or 57 hereof wherein said composition comprises a mixture of aluminum oxide trihydrate and magnesium oxide.

62. The invention according to claims 55, 56 or 57 hereof wherein said composition comprises a surfactant.

63. The invention according to claims 55, 56 or 57 hereof wherein said composition comprises a fibrous reinforcing material.

64. The invention according to claims 55, 56 or 57 hereof wherin said composition comprises a foaming agent.

65. The invention according to claim 64 hereof wherein said foaming agent is a carbonate selected from the group consisting of $MgCO_3$, $CaCO_3$, $ZnCO_3$ or $Li_2CO_3$.

66. The invention according to claim 64 hereof wherein said foaming agent is fluorinated hydrocarbon having a boiling point lower than the temperature at which said intermixed material becomes rigid.

67. A rigid, water-resistant phosphate ceramic material obtained by reacting (1) from about 11 to about 65 parts by weight calculated on an anhydrous basis of at least one metal oxide selected from the group consisting of $Al_2O_3$, MgO, CaO or ZnO or the hydrates thereof;

(2) from about 80 to about 190 parts by weight of a phosphoric acid solution comprising the equivalent of from about 35 to about 75% by weight of phosphorus pentoxide based on the weight of the acid solution, the water of hydration of said metal oxide being included when calculating the phosphorus pentoxide content; and (3) about 100 parts by weight of calcium silicate.

68. The invention according to claim 67 hereof comprising from about 13 to about 26 parts of metal oxide, about 100 parts of calcium silicate, and from about 90 to about 150 parts of phosphoric acid solution comprising the equivalent of from about 40 to about 70% phosphorus pentoxide.

69. The invention according to claim 67 hereof comprising from about 15 to about 22 parts of metal oxide, about 100 parts of calcium silicate, and from about 100 to about 130 parts of phosphoric acid solution comprising the equivalent of from about 45 to about 65% phosphorus pentoxide.

70. The invention as set forth in claims 67, 68 or 69 hereof wherein said ceramic material is obtained by reacting a reaction solution and a component mixture, said reaction solution comprising said phosphoric acid solution and at least a portion of said metal oxide, and said component mixture comprising said calcium silicate and the remainder of said metal oxide.

71. The invention according to claims 67, 68, or 69 hereof wherein the amount of metal oxide used to prepare said reaction solution and the temperature of said reaction solution are selected so as to approximately predetermine the point in time at which said intermixed material becomes rigid relative to the point in time at which vaporization of the water occurs.

72. The invention according to claim 71 hereof wherein the particle size of said metal oxide is not larger than 325 mesh (Tyler Standard) and the particle size of said calcium silicate is not larger than 200 mesh (Tyler Standard).

73. The invention according to claim 71 herein wherein said metal oxide is aluminum oxide trihydrate.

74. The invention according to claim 71 hereof wherein said metal oxide is magnesium oxide.

75. The invention according to claim 71 hereof wherein said metal oxide comprises a mixture of aluminum oxide trihydrate and magnesium oxide.

76. The invention according to claim 71 hereof wherein said ceramic material comprises a surfactant.

77. The invention according to claim 71 hereof wherein said ceramic comprises a fibrous reinforcing material.

78. The invention according to claim 71 hereof comprising a foaming agent.

79. The invention according to claim 78 hereof wherein said foaming agent is a carbonate selected from the group consisting of $MgCO_3$, $CaCO_3$, $ZnCO_3$ or $Li_2CO_3$.

80. The invention according to claim 78 hereof wherein said foaming agent is a fluorinated hydrocarbon having a boiling point lower than the temperature at which said intermixed material becomes rigid.

* * * * *